United States Patent
Uehara

(10) Patent No.: US 10,288,004 B2
(45) Date of Patent: May 14, 2019

(54) DIESEL ENGINE CONTROL DEVICE AND CONTROL METHOD

(71) Applicant: Nissan Motor Co., Ltd., Yokohama-Shi, Kanagawa (JP)

(72) Inventor: Isshou Uehara, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 180 days.

(21) Appl. No.: 15/311,554

(22) PCT Filed: May 27, 2014

(86) PCT No.: PCT/JP2014/063948
§ 371 (c)(1),
(2) Date: Nov. 16, 2016

(87) PCT Pub. No.: WO2015/181880
PCT Pub. Date: Dec. 3, 2015

(65) Prior Publication Data
US 2017/0107929 A1    Apr. 20, 2017

(51) Int. Cl.
*F02D 41/24* (2006.01)
*F02D 41/40* (2006.01)
*F02D 41/00* (2006.01)

(52) U.S. Cl.
CPC ..... *F02D 41/2467* (2013.01); *F02D 41/0007* (2013.01); *F02D 41/405* (2013.01);
(Continued)

(58) Field of Classification Search
CPC ............. F02D 41/0007; F02D 41/2467; F02D 41/405; F02D 2200/0602; F02D 2200/101; F02D 2250/38; Y02T 10/44
(Continued)

(56) References Cited

U.S. PATENT DOCUMENTS 8,156,730 B2 *  4/2012  Guo ...................... F02D 41/029
                                                              60/280
2007/0261395 A1 * 11/2007 Mahnken ................ F01N 1/165
                                                              60/297
(Continued)

FOREIGN PATENT DOCUMENTS

EP       1211404 A1    6/2002
EP       1245817 A2   10/2002
(Continued)

OTHER PUBLICATIONS

Machine Translation JP 5170317 Done Apr. 11, 2017.*

*Primary Examiner* — Patrick D Maines
*Assistant Examiner* — Dapinder Singh
(74) *Attorney, Agent, or Firm* — Young Basile Hanlon & MacFarlane, P.C.

(57) ABSTRACT

A direct injection diesel engine is provided with a fuel injection nozzle which is capable of performing a multistage injection. In a middle-or-high load region, in order to reduce soot, an after-injection is performed immediately after a main injection. An injection timing of the after-injection is set from a map in accordance with a driving condition. During a transient time, the injection timing of the after-injection is corrected on a basis of a difference ΔP between an actual rail pressure rPrail and a target rail pressure tPrail. In a case where the injection timing after the correcting is more retardation angle side than a threshold value, the after-injection is inhibited.

8 Claims, 8 Drawing Sheets

(52) U.S. Cl.
CPC ............... *F02D 2200/0602* (2013.01); *F02D 2200/101* (2013.01); *F02D 2250/38* (2013.01); *Y02T 10/44* (2013.01)

(58) Field of Classification Search
USPC .................................. 60/286, 295, 297, 311
See application file for complete search history.

(56) References Cited

U.S. PATENT DOCUMENTS

2009/0266060 A1* 10/2009 Guo ..................... F02D 41/029
 60/295
2011/0146233 A1* 6/2011 Carlill ................... F01N 3/0235
 60/274

FOREIGN PATENT DOCUMENTS

| JP | 2000227061 | A | 8/2000 |
| JP | 2005233163 | A | 9/2005 |
| JP | 2009002232 | A | 1/2009 |
| JP | 5170317 | * | 1/2013 |
| JP | 2013256890 | A | 12/2013 |
| WO | 2008156157 | A1 | 12/2008 |
| WO | 2012029180 | A1 | 3/2012 |

* cited by examiner

FIG.6
FIG. 6A
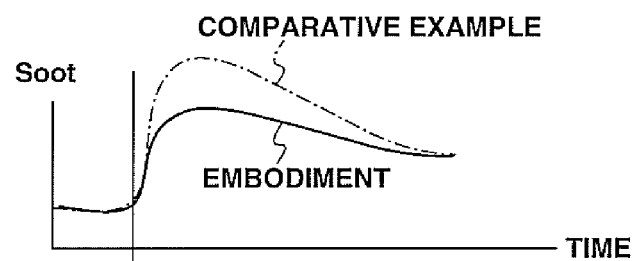
FIG. 6B
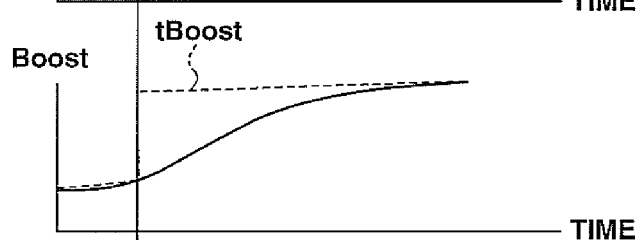
FIG. 6C
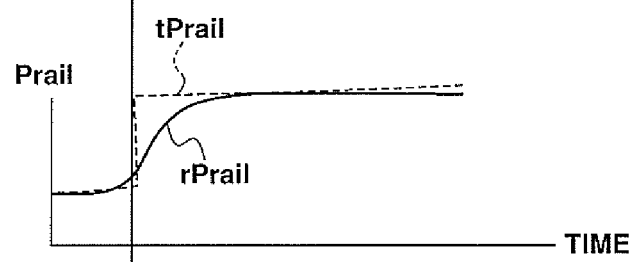
FIG. 6D
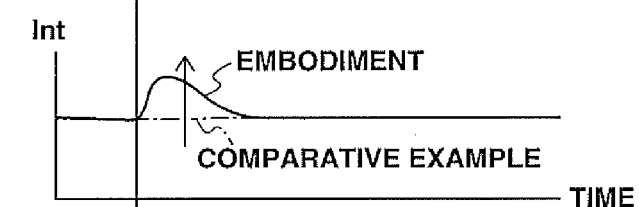
FIG. 6E
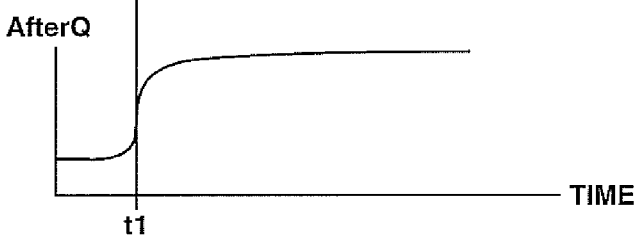

FIG.7
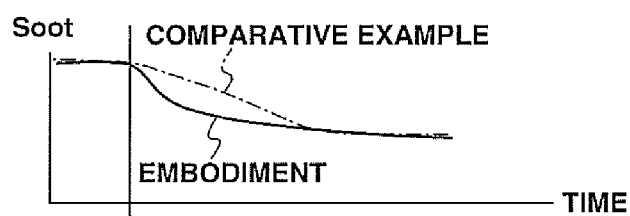
FIG. 7A
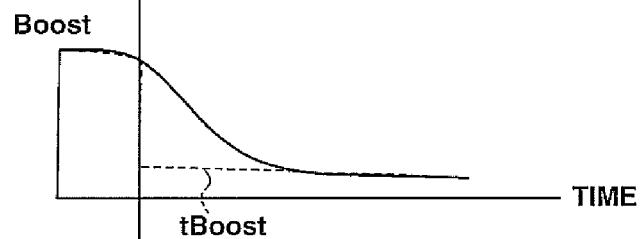
FIG. 7B
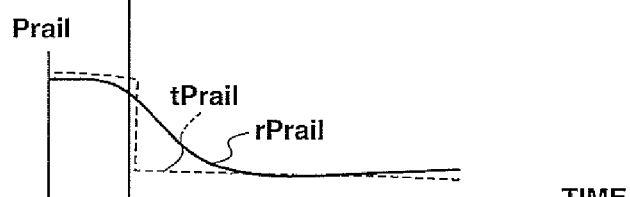
FIG. 7C
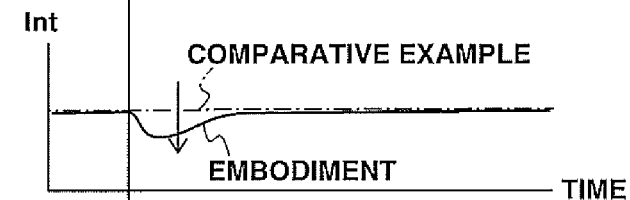
FIG. 7D
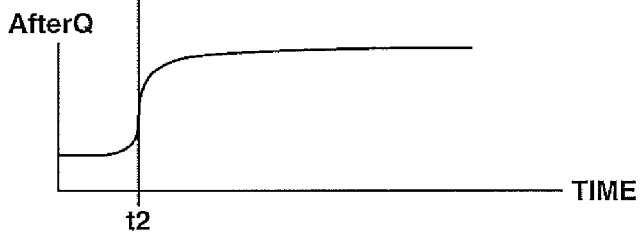
FIG. 7E

DIESEL ENGINE CONTROL DEVICE AND CONTROL METHOD

TECHNICAL FIELD

The present invention relates to control apparatus and control method for a direct injection diesel engine in which a fuel injection nozzle which is capable of performing a multistage injection is equipped and an after-injection is performed immediately after a main injection.

BACKGROUND

In order to suppress a generation of soot which provides a problem in a direct injection diesel engine, a technique in which an after-injection in a relatively short period of time is performed immediately after a main injection and soot generated in association with a combustion of the main injection is combusted together with fuel by the after-injection is described in Japanese Patent Application First Publication (tokkai) No. 2005-233163 and Japanese Patent Application First Publication (tokkai) No. 2000-227061 and so forth.

In such a technique of the after-injection as described above, a certain optimum value corresponding to an individual driving condition is present as an interval from a time at which the main injection is ended to a time at which the after-injection is started. As shown in a characteristic a of FIG. 8, as the interval shown in a lateral axis of FIG. 8 becomes gradually larger, a reduction of soot is observed when the after-injection at an appropriate interval is performed. It should be noted that a left end of the lateral axis of FIG. 8 indicates a case where the interval is zero, namely, a case where no after-injection is performed (in other words, a case where the injection is performed without split of the injection into the main injection and the after-injection). Hence, an injection timing of the after-injection in accordance with the driving condition (load, revolution speed, and so forth) is, for example, set in a form of a map. In the example of FIG. 8, such an optimum injection timing of the after-injection as shown in FIG. 8 is given as an injection timing IT1.

However, during a transient time of the engine, the reduction effect of soot according to the after-injection is lowered. For example, a characteristic b of FIG. 8 indicates an example of the characteristic of the after-injection during an acceleration time. As shown in FIG. 8, soot is hardly reduced at injection timing IT1 preset as an optimum point. When the interval is made larger than injection timing IT1, the reduction of soot is observed.

It can be thought that, according to the present inventor's research, since a fuel pressure (so-called, a rail pressure) when the main injection is carried out before the after-injection is lower than a target fuel pressure (a target fuel pressure during a steady state time) due to a response delay, during an acceleration time, it can be thought that this is due to not obtaining an expected gas flow within a cavity. That is, since the fuel pressure supplied to the fuel injection nozzle via the common rail is variably set on a basis of an engine revolution speed and a load, the target value of the fuel pressure is varied during a transient time and the target fuel pressure becomes, in general, higher during the acceleration time. However, since the response delay is present in the variation of the actual fuel pressure, the actual fuel pressure does not reach to an expected fuel pressure during the main injection and a momentum of a spray is reduced. Therefore, the injection timing of the after-injection which is optimum for the reduction of soot is made different.

FIGS. 9(a)-(c) are explanatory views for explaining an influence of gas flow within the cavity according to the main injection on the after-injection and show a local excess air ratio distribution within a combustion chamber in a form of contour lines. It should be noted that FIGS. 9(a)-(c) depict the excess air ratio divided into 14-stage levels. As a representative, a region denoted by a reference sign of E1 is a highest excess air ratio region, a region denoted by a reference sign of E3 is a lowest excess air ratio region, and a region denoted by a reference sign of E2 is a middle excess air ratio region. FIG. 9 (a) shows an excess air ratio distribution within the combustion chamber when the after-injection is carried out (at a time of the end of the after-injection) after the main injection under an appropriate fuel pressure is carried out. At this stage, a reverse squish flow is generated due to a lowering start of a piston and the momentum of the main injection. Riding on this squish flow, a combustion section surrounding of a bottom section of the cavity is tried to be moved toward a center part of the cavity. In FIG. 9 (a), since expected gas flow is obtained, spray F of the after-injection is injected toward a region in which oxygen is present to some degree. Hence, the reduction of soot is achieved.

Whereas, FIG. 9(b) shows a state in which the fuel pressure of the main injection is low. In this case, since the momentum of the main injection is low and the reverse squish flow is weak, the after-injection is carried out before the combustion section surrounding the bottom section of the cavity is moved toward the center section of the cavity. Therefore, spray F of the after-injection is injected toward a region in which oxygen (quantity) is small so that an increase of soot is introduced.

FIG. 9(c) shows a state of a case in which the after-injection is executed at a crank angle slightly retarded than a case of FIG. 9(b). Since the combustion section is moved toward the center section of the cavity, spray F of the after-injection can be given to the region in which oxygen is present to some degree and the reduction of soot can be achieved.

Even during a deceleration, from the similar reason, the appropriate injection timing of the after-injection is made different from a case during the steady state. Since, during the deceleration, in general, the fuel pressure becomes excessively higher than the target value due to a response delay, the appropriate injection timing of the after-injection becomes furthermore earlier.

SUMMARY

It is an object of the present invention to avoid a worsening of soot due to a variation of the fuel pressure during a transient time as described above.

According to the present invention, there is provided a control apparatus for a direct injection diesel engine, the diesel engine having a fuel injection nozzle capable of performing a multi-stage injection and in which an after-injection is performed immediately after a main injection, the control apparatus comprising: means for variably controlling a fuel pressure supplied to the fuel injection nozzle on a basis of an engine revolution speed and a load; means for setting an injection timing of the after-injection on a basis of the engine revolution speed and the load; and means for correcting the injection timing of the after-injection on a basis of a detected actual fuel pressure, during a transient time of the engine.

According to the present invention, the injection timing of the after-injection can be made appropriate, corresponding to an excessive deficiency of a momentum of the main injection due to a shift of an actual fuel pressure, during the transient time, from a target fuel pressure, and a more accurate reduction of soot due to the after-injection can be achieved.

BRIEF DESCRIPTION OF THE DRAWINGS

FIGS. 6(a)-6(e) are timing charts representing an operation during an acceleration;

FIGS. 7(a)-7(e) are timing charts representing an operation during a deceleration;

DETAILED DESCRIPTION OF THE EMBODIMENTS

Hereinafter, a preferred embodiment of the present invention will be explained in details on a basis of attached drawings.

Figure 1:
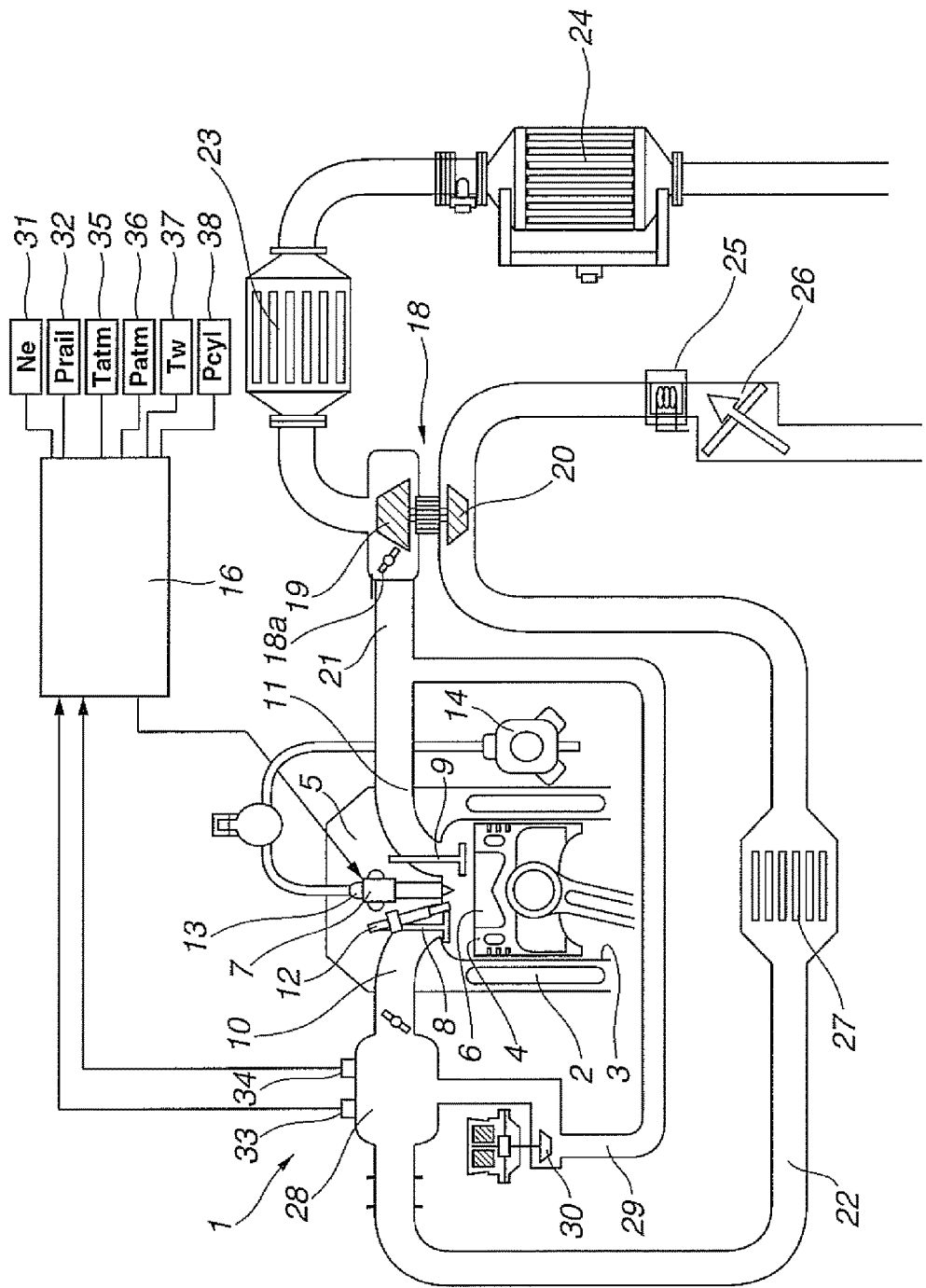
FIG. 1 is a structural explanatory view of a diesel engine in a preferred embodiment.

FIG. 1 is a structure explanatory view representing a direct injection diesel engine 1 together with its intake and exhaust systems. A piston 4 is slidably fitted to a cylinder 3 formed on a cylinder block 2. A cylinder head 5 fixed on an upper surface of cylinder block 2 covers an upper end opening of cylinder 3.

A re-entrant type cavity 6 is recessed on a top surface of piston 4. This cavity 6 is concentrically formed with piston 4 and has a relatively large opening diameter. In addition, at above-described cylinder head 5 side, a multi-injection-hole fuel injection nozzle 7 is disposed at a center position of cylinder 3 corresponding to a center of cavity 6. In this embodiment, above-described fuel injection nozzle 7 is disposed along a center axial line of cylinder 3, namely, is vertically disposed.

A pair of intake valves 8 and a pair of exhaust valves 9 are disposed in cylinder head 5. The pair of intake valves 8 open and close tip opening sections of an intake port 10 and the pair of exhaust valves 9 open and close tip opening sections of an exhaust port 11.

Respective valve stems of these intake valves 8 and exhaust valves 9 are disposed in vertical postures in which the respective valve stems are parallel to center axial lines of cylinder 3. A glow plug 12 is disposed adjacently to fuel injection nozzle 7.

Fuel injection nozzle 7 of each cylinder is connected to a diagrammatically shown common rail 13. When a needle (not shown) of fuel injection nozzle 7 is lifted in response to a drive signal from an engine control unit 16, fuel under a high pressure supplied within common rail 13 by means of a high pressure fuel pump 14 is injected. The fuel pressure within common rail 13 is pressure regulated to a predetermined pressure which accords with a driving condition by means of engine control unit 16 via a pressure regulator valve 15. It should, herein, be noted that above-described fuel injection nozzle 7 is a highly responsive characteristic nozzle using a piezoelectric element or so forth. Fuel injection nozzle 7 can inject and split, at multiple stages, a gross fuel injection quantity determined in accordance with a load.

Diesel engine 1 in this embodiment is provided with a turbocharger (turbosupercharger) 18. A turbine 19 of turbocharger 18 is disposed in a passage of an exhaust passage 21 and a compressor 20 is disposed in a passage of an intake passage 22. A pre-catalytic converter 23 and a main-catalytic converter 24 are serially arranged at a downstream side than turbine 19 of exhaust passage 21. An airflow meter 25 and an air cleaner 26 are disposed at a upstream side than compressor 20 of intake passage 22. An intercooler 27 is disposed in intake passage 22 between a collector section 28 which is at the downstream side than compressor 20 and compressor 20. Furthermore, an exhaust recirculation unit includes: an exhaust recirculation passage 29 which communicates between a more upstream side position than turbine 19 of exhaust passage 21 and intake collector section 28; and an exhaust recirculation control valve 30 installed to control an exhaust recirculation percentage to a predetermined exhaust recirculation percentage in accordance with an engine driving condition. Above-described turbocharger 18 is adopted in a form which can variably control a boost pressure in accordance with the engine driving condition by adjusting an opening angle of a wastegate valve 18a.

Above-described engine control unit 16 inputs detection signals from such sensors as: airflow meter 25 described above; a revolution speed sensor 31 for detecting an engine revolution speed Ne; a rail pressure sensor 32 for detecting a rail pressure (actual rail pressure) rPrail within common rail 13; an intake temperature sensor 33 for detecting an intake temperature Tin; a boost pressure sensor 34 for detecting charge (boost) pressure Boost; an atmospheric temperature sensor 35 for detecting an atmospheric (air) temperature Tatm; an atmospheric pressure sensor 36 for detecting an atmospheric pressure Patm; a water temperature sensor 37 for detecting a water temperature Tw; an internal cylinder pressure sensor 38 for detecting an internal cylinder pressure Pcyl; and so forth.

Figure 5:
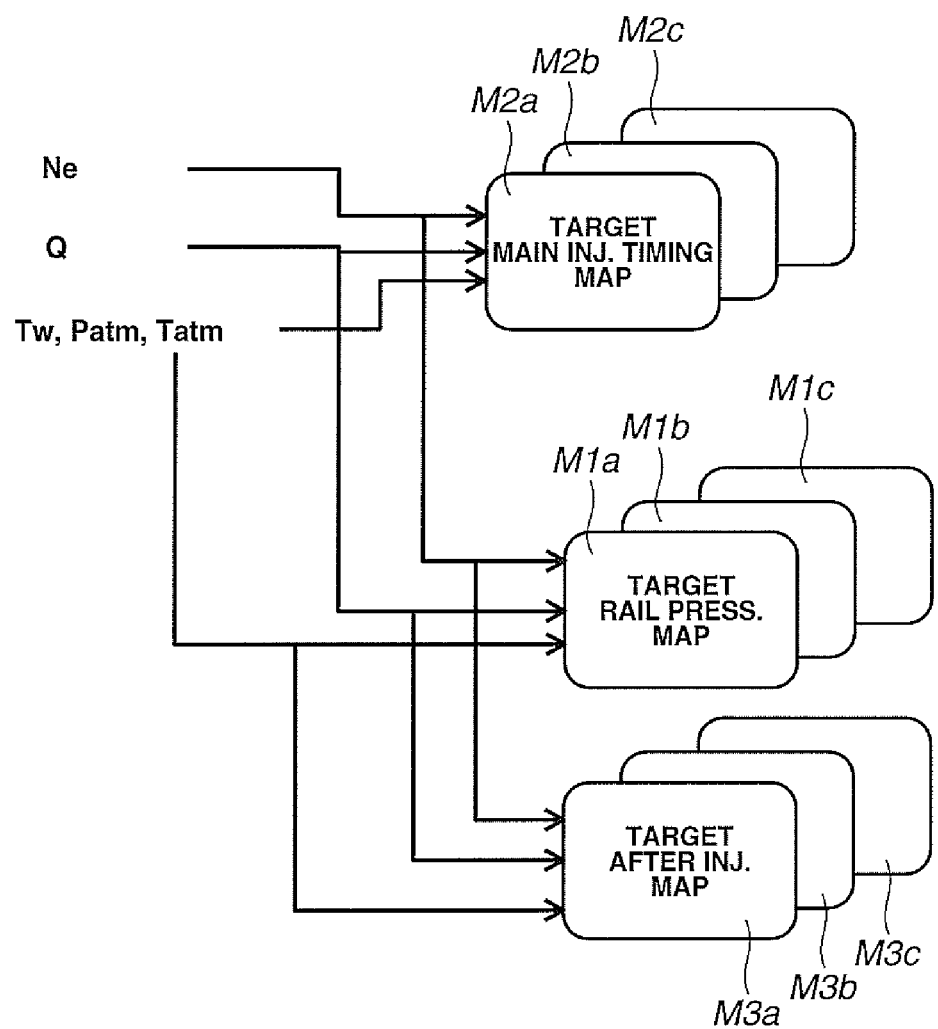
FIG. 5 is an explanatory view for one example of a control map.
Figure 8:
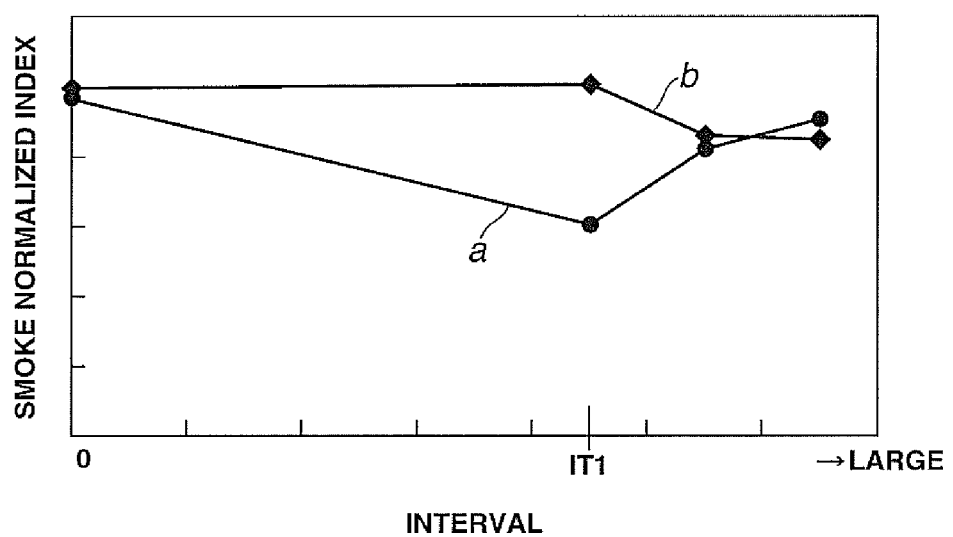
FIG. 8 is a characteristic graph representing a relationship between an interval of an after-injection and soot.
Figure 9B:
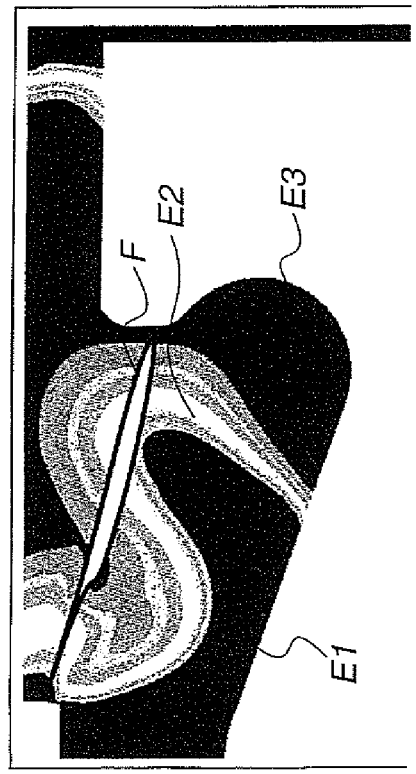
FIGS. 9(a), (b), and (c) are explanatory views representing an influence of gas flow according to the main injection on the after-injection.
Figure 9A:
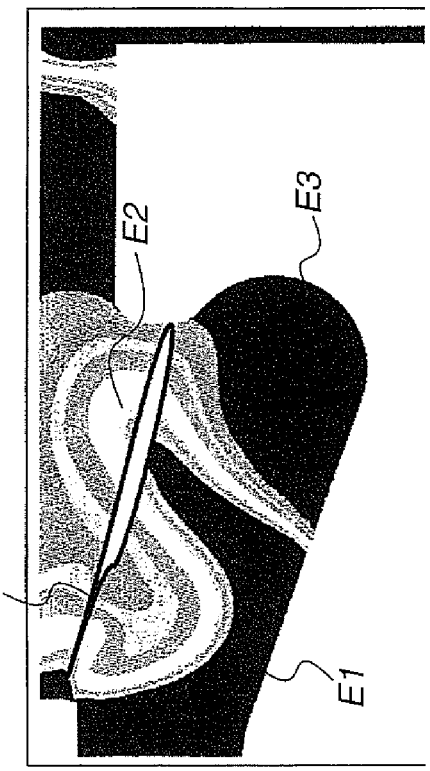
Figure 9C:
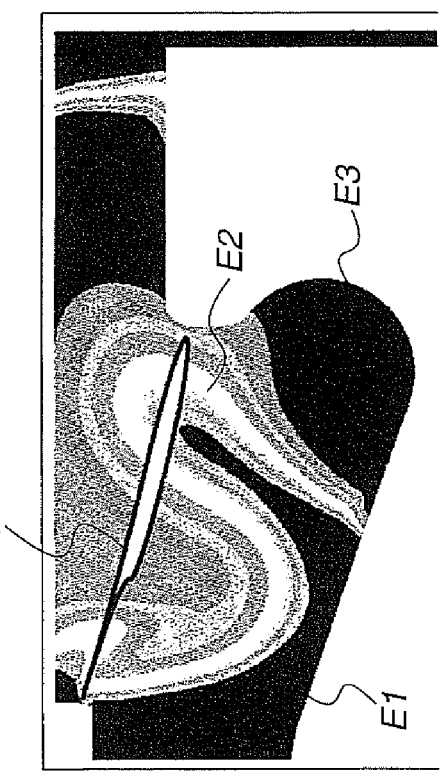

In such a structure as described above, gross injection quantity Q to be injected from fuel injection nozzle 7 is determined according to the load of diesel engine 1 or a target torque thereof. In addition, a target value of fuel pressure within common rail 13, namely, a target rail pressure tPrail is determined on a basis of gross fuel injection quantity Q, revolution speed Ne, water temperature Tw, atmospheric pressure Patm, and the atmospheric (air) temperature Tatm. Specifically, as shown in FIG. 5, maps (M1a, M1b, M1c, . . . ) with gross injection quantity Q and revolution speed Ne as parameters are preset for each water temperature, for each atmospheric pressure, and for each atmospheric temperature. By searching these maps, target rail pressure tPrail which accords with the driving condition at that moment is determined.

Figure 2:
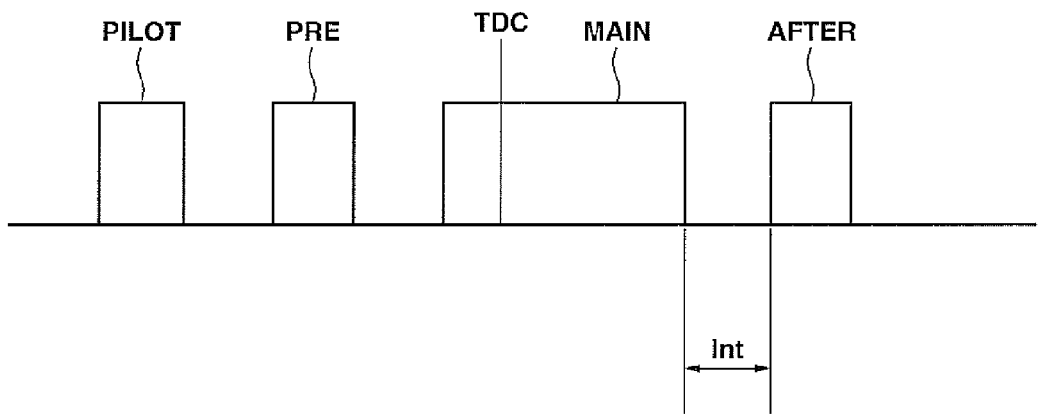
FIG. 2 is an explanatory view of one example of a split injection.

Then, fuel injected from fuel injection nozzle 7 is split at the multiple stages and injected in accordance with the driving condition. For example, as shown in FIG. 2, in addition to a main injection carried out with a top dead center TDC inserted in the main injection, fuel is split into a pilot injection, a pre-injection, and an after-injection and injected. The after-injection is provided to reduce soot mainly generated due to a combustion by the main injection.

In a low load region and a middle-or-high load region except a full open time, the after-injection is basically carried out.

The injection quantity of the main injection and the injection timing of the main injection are determined, with a plurality of maps with gross injection quantity Q and revolution speed Ne parameters provided (refer to M2a, M2b, M2c, . . . in FIG. 5) in accordance with water temperature Tw, atmospheric pressure Patm, and atmospheric (air) temperature Tatm, by searching corresponding values, in the same way as above-described target rail pressure tPrail. It should be noted that although, in FIG. 5, only the maps for the injection timing of the main injection are illustrated, the similar maps for the injection quantity are prepared.

The injection timing of the after-injection injected via appropriate interval Int (refer to FIG. 2) after the end of the main injection is, similarly, determined by searching the corresponding values with maps with gross injection quantity Q and revolution speed Ne as parameters preset in accordance with water temperature Tw, atmospheric pressure Patm, and atmospheric temperature Tatm (refer to M3a, M3b, M3c, . . . in FIG. 5).

The after-injection is carried out at an optimum interval which accords with the driving condition so that soot generated by the main injection is combusted together with fuel of the after-injection and, hence, the reduction of soot in the middle-or-high load region can be achieved.

However, as described before, when the actual fuel pressure (actual rail pressure rPrail) during the transient time is deviated from target rail pressure tPrail due to the response delay, the injection timing of the after-injection set from the map on a basis of gross injection quantity Q and revolution speed Ne does not become appropriate corresponding to actual gas flow so that an expected soot reduction action is not obtained. Hence, in this embodiment, a correction is made on a basis of actual rail pressure rPrail so that the injection timing of the after-injection becomes appropriate.

Figure 3:
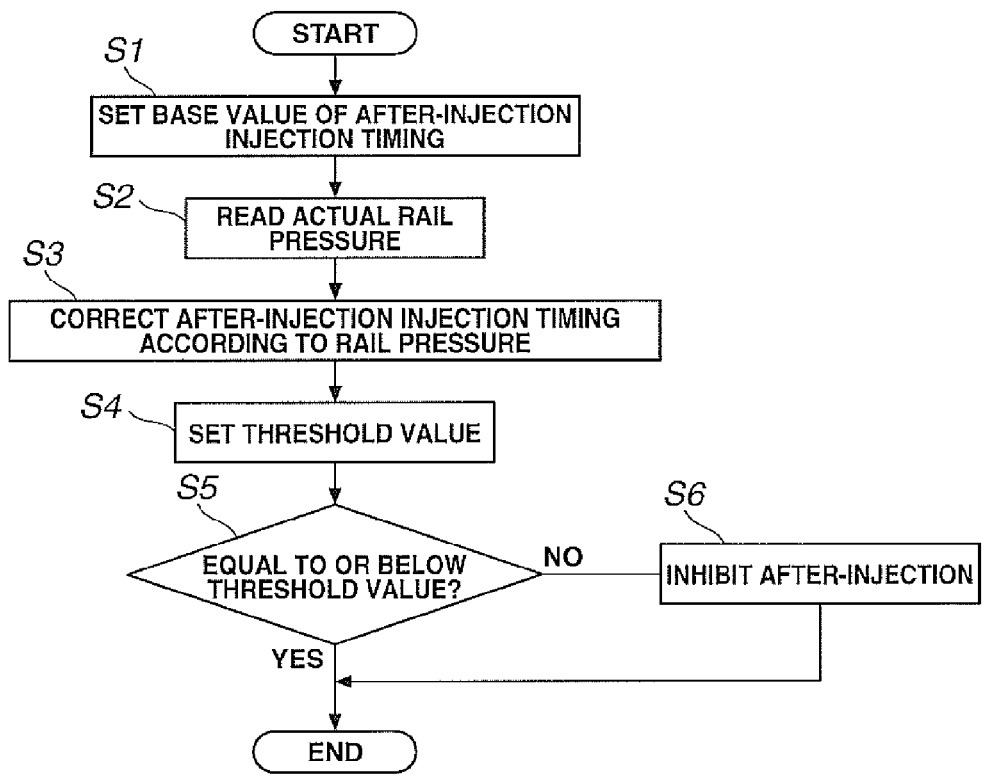
FIG. 3 is a flowchart representing one example of control.

FIG. 3 shows a flowchart representing one example of a specific process. At a step 1, engine control unit 16 determines a base value of the injection timing of the after-injection from the driving condition at that moment. In details, the corresponding injection timing of the after-injection is searched using above-described maps (M3a, M3b, M3c . . . in FIG. 5) on a basis of gross injection quantity Q, revolution speed Ne, water temperature Tw, atmospheric pressure Patm, and atmospheric temperature Tatm using the maps (M3a, M3b, M3c . . . in FIG. 5).

Next, at a step 2, engine control unit 16 reads actual rail pressure rPrail detected by rail pressure sensor 32 at a time point at which the injection of the main injection is carried out. It should be noted that, as an alternative, the value of actual rail pressure rPrail at the present time point may be used. Then, at a step 3, the correction is added to the injection timing of the after-injection on a basis of a difference ΔP between target rail pressure tPrail at that moment and actual rail pressure rPrail, engine revolution speed Ne, and injection quantity Qmain of the main injection. Basically, in a case where actual rail pressure rPrail is lower than target rail pressure tPrail, the injection timing of the after-injection is corrected toward a retardation side. In a case where actual rail pressure rPrail is higher than target rail pressure tPrail, the injection timing of the after-injection is corrected toward an advance side. It should be noted that, during the acceleration, in general, the former mode is adopted and, during the deceleration, in general, the latter mode is adopted. The difference between actual rail pressure rPrail and target rail pressure tPrail is participated in a speed of the reverse squish flow during the after-injection, as described before. In addition, even if difference ΔP has the same value, the speed of the reverse squish flow is different according to engine revolution speed Ne and injection quantity Qmain of the main injection. Hence, including these, a required correction quantity is determined and the correction is added to the base value of the injection timing.

Next, at a step 4, a threshold value ITlim indicating a limit of a retardation angle side of the injection timing of the after-injection is set on a basis of the engine driving condition (for example, gross injection quantity Q, revolution speed Ne, water temperature Tw, and so forth). This is, mainly, determined from viewpoints of fuel consumption, oil dilution according to the after-injection, and so forth.

At a step 5, engine control unit 16 determines whether the (post correction) injection timing of the after-injection after the correction determined at step 3 is equal to or below a threshold value ITlim (namely, a more advance angle side than threshold value ITlim). It should be noted that, since the after-injection is not executed in a state in which the injection timing is limited to threshold value ITlim, there is a possibility that the worsening of soot is, on the contrary, brought out in a case of the after-injection at an inappropriate injection timing.

If the injection timing of the after-injection after the correction is equal to or below threshold value ITlim, the after-injection is executed in accordance with another injection control routine not shown.

In this way, in the above-described embodiment, the injection timing of the after-injection is corrected on a basis of difference ΔP between actual rail pressure rPrail and target rail pressure tPrail at an injection time point at which the main injection is carried out, in a case where actual rail pressure rPrail and is varied delaying with respect to target rail pressure tPrail, during the transient time. Hence, in a form which corresponds to the speed of actual reverse squish flow, the after-injection is carried out at an appropriate timing and the reduction of soot by the after-injection is achieved.

It should be noted that, in the above-described embodiment, the value of the injection timing of the after-injection itself is compared with threshold value ITlim. A threshold value may be provided for interval Int from the main injection end time point to the after-injection start point. Both are not substantially changed.

In addition, in the above-described embodiment, a transient determination is not particularly made. This is because, in the steady-state time, difference ΔP between actual rail pressure rPrail and target rail pressure tPrail becomes zero and the correction is substantially not made at step 3. However, the determination of whether the present state is in the steady state or in the transient state is made from a variation quantity of an opening angle of the accelerator pedal and, only during the transient time, the processes of steps 2 through 6 may be carried out.

Figure 4:
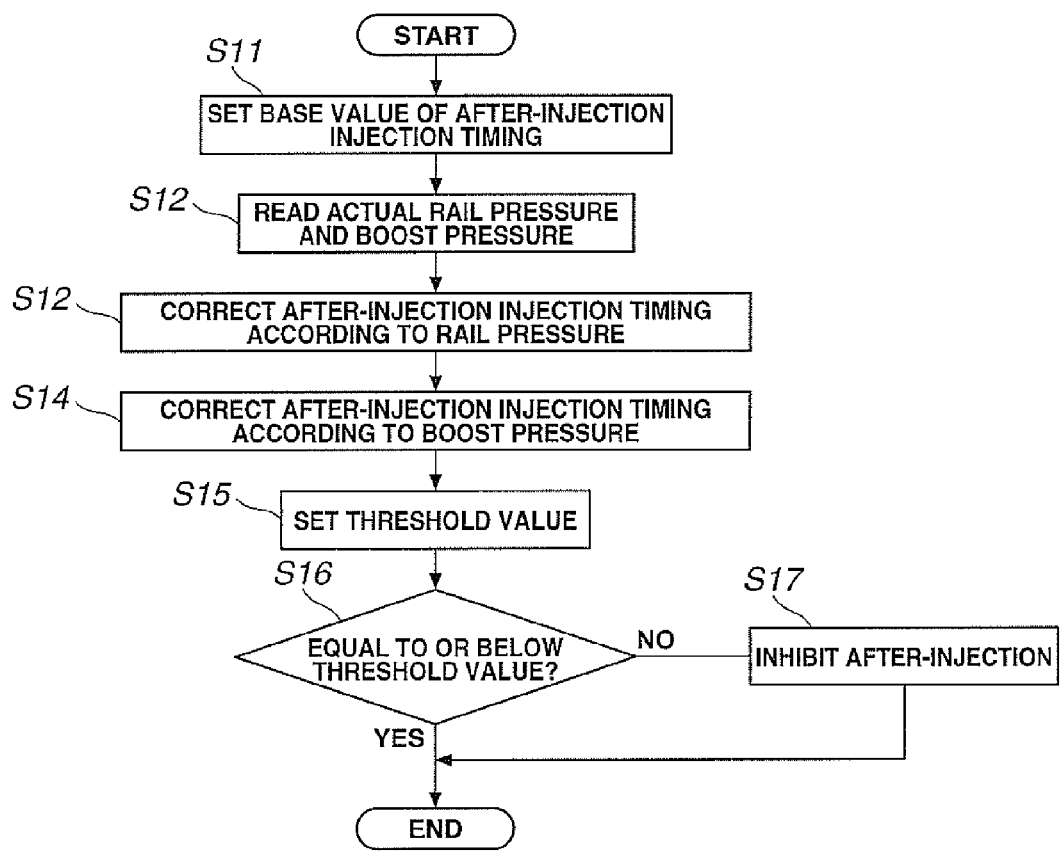
FIG. 4 is a flowchart representing a different example of control.

FIG. 4 shows a flowchart representing another example of the specific process. In this embodiment, a response delay during the transient time of boost pressure Boost by means of turbocharger 18 is furthermore taken into consideration. A target value tBoost of boost pressure Boost is similarly set on a basis of the engine driving condition (for example, gross injection quantity Q, revolution speed Ne, water temperature Tw, and so forth). Hence, target value tBoost is varied during the transient time of acceleration and deceleration. The response delay is present in the variation of actual boost pressure Boost. This boost pressure Boost gives an influence on the momentum of the main injection described before and a consequently generated gas flow. When actual boost pressure Boost is made different from target value tBoost due to the response delay, an influence on an optimum injection timing of the after-injection occurs. It should be noted that, in the actual acceleration and deceleration, the influence of the response delay of this boost pressure Boost is far small as compared with the influence of the response delay of actual rail pressure rPrail.

At a step 11, engine control unit 16 derives the base value of the injection timing of the after-injection from the driving condition at that moment. In details, the corresponding injection timing of the after-injection is searched using above-described maps (M3a, M3b, M3c . . . in FIG. 5) on a basis of gross injection quantity Q, revolution speed Ne, water temperature Tw, atmospheric pressure Patm, and atmospheric temperature Tatm.

At a step 12, engine control unit 16 reads actual rail pressure rPrail, at the time point of the injection of the main injection, detected by rail pressure sensor 32 and reads boost pressure Boost, at the time point of the injection of the main injection, detected by boost pressure sensor 34. It should be noted that, as an alternative, values of actual rail pressure rPrail and boost pressure Boost at the present moment may be used. Then, at a step 13, the correction is added to the injection timing of the after-injection on a basis of difference ΔP between target rail pressure tPrail and actual rail pressure rPrail at that moment, engine revolution speed Ne, and injection quantity Qmain of the main injection. Basically, in a case where actual rail pressure rPrail is higher than target rail pressure tPrail, the injection timing of the after-injection is corrected to a delay (retardation) side. In a case where actual rail pressure rPrail is higher than target rail pressure tPrail, the injection timing of the after-injection is corrected toward an advance side. As described before, the former mode is, in general, taken during the acceleration and the latter mode is, in general, taken during the deceleration.

Furthermore, at a step 14, engine control unit 16 adds the further correction to the injection timing of the after-injection in accordance with a difference ΔB between boost pressure target value tBoost at that moment and boost pressure Boost at the injection time point of the main injection read at step 12. Basically, in a case where boost pressure Boost is lower than target value tBoost, the injection timing of the after-injection is corrected toward the advance side. In a case where boost pressure Boost is higher than target value tBoost, the injection timing of the after-injection is corrected toward the delay (retardation) side. During the acceleration, the former mode is, in general, taken. During the deceleration, the latter mode is, in general, taken.

Next, at a step 15, threshold value ITlim indicating the limit of the retardation angle side of the injection timing of the after-injection is set on a basis of the engine driving condition (for example, gross injection quantity Q, revolution speed Ne, water temperature Tw, and so forth). This is, mainly, determined from viewpoints of fuel consumption and oil dilution according to the after-injection.

At a step 16, engine control unit 16 determines whether the injection timing of the after-injection after the correction determined at step 14 is equal to or below threshold value (namely, a more advance angle side than threshold value ITlim). It should herein be noted that, if the injection timing after the correction is more retardation angle side than threshold value ITlim, the routine goes to a step 17 in which the after-injection is inhibited.

In this way, according to the embodiment in which both of the response delay of actual rail pressure rPrail and the response delay of boost pressure Boost are taken into consideration, a state of the actual reverse squish flow can more accurately be grasped and the reduction of soot according to the after-injection is appropriately achieved.

FIGS. 6(a)-6(e) and 7(a)-7(e) are timing charts representing the correction during the transient time according to the embodiment shown in FIG. 4, FIGS. 6(a)-6(e) representing operations during the acceleration and FIGS. 7(a)-7(e) representing operations during the deceleration, respectively. (a), (b), (c), and (d) of FIGS. 6 and 7 represent a quantity of emission of soot, boost pressure Boost, rail pressure Prail, and interval Int of the after-injection, respectively. It should be noted that each of FIGS. 6(e) and 7(e) represents the injection quantity of the after-injection.

In the example of FIGS. 6(a)-6(e), the acceleration is carried out at a time t1 and target value tBoost of the boost pressure and target rail pressure tPrail are raised in a stepwise manner. However, actual boost pressure Boost and actual rail pressure rPrail are varied in association with the response delay. This causes interval Int from the main injection end to the after-injection start to be corrected in an expansion direction. Soot that diesel engine 1 exhausts is increased in association with the acceleration, as shown in FIG. 6(a). As compared with the characteristic of a comparative example in which the injection timing of the after-injection is not appropriately corrected, in this embodiment, the quantity of emission of soot is reduced according to the after-injection at the appropriate injection timing.

In the example shown in FIGS. 7(a)-7(e), the deceleration is carried out from a relatively high load region at a time t2 and target value tBoost of the boost pressure and target rail pressure tPrail are reduced in the stepwise manner. Whereas, actual boost pressure Boost and actual rail pressure rPrail are varied in association with the response delay. In this case, interval Int from the main injection end to the after-injection start is corrected in a decrease direction. This causes the injection timing of the after-injection to be more appropriate and the quantity of emission of soot is reduced.

The invention claimed is:

1. A control apparatus for a direct injection diesel engine, comprising:
   a controller configured:
      to set a target fuel pressure on a basis of an engine revolution speed and a load to variably control a fuel pressure supplied to a fuel injection nozzle along the target fuel pressure;
      to set a base value of an injection timing of an after-injection on a basis of the engine revolution speed and the load;
      to correct the base value of the injection timing of the after-injection toward an advance side in a case where an actual fuel pressure is higher than the target fuel pressure, on a basis of a difference between a detected actual fuel pressure and the target fuel pressure, during an acceleration or deceleration of the engine;
      to determine whether the corrected base value is equal to or lower than a threshold value; and
      to determine whether the after-injection performed immediately after a main injection is executed or inhibited depending upon a result of the determination,
      to control the direct injection diesel engine to perform the after injection immediately after the main injection at a timing determined by the corrected base value when the controller determines that the corrected base value is equal to or lower than the threshold value and that the after-injection performed immediately after the main injection is executed.

2. The control apparatus for the direct injection diesel engine as claimed in claim 1, wherein the diesel engine includes a turbosupercharger and the control section is configured:
to set a target boost pressure on a basis of the engine revolution speed and the load;
to correct the base value of the injection timing of the after-injection toward the advance side in a case where an actual boost pressure is lower than the target boost pressure, on a basis of a difference between a detected actual boost pressure and the target boost pressure, during the acceleration or deceleration of the engine;
to determine whether the corrected base value is equal to or lower than a threshold value; and
to determine whether the after-injection performed immediately after a main injection is executed or inhibited depending upon a result of the determination.

3. The control apparatus for the diesel engine as claimed in claim 2, wherein the control section is configured to correct the base value of the injection timing of the after-injection toward a retardation side in a case where the actual boost pressure is higher than the target boost pressure.

4. The control apparatus for the direct injection diesel engine as claimed in claim 1, wherein the control section inhibits the after-injection when the injection timing of the after-injection after the correcting is more retardation angle side than a threshold value.

5. The control apparatus for the direct injection diesel engine as claimed in claim 1, wherein a value of the actual fuel pressure at the time of the main injection is used for the actual fuel pressure.

6. The control apparatus for the diesel engine as claimed in claim 1, wherein the control section is configured to correct the base value of the injection timing toward a retardation side in a case where the actual fuel pressure is lower than the target fuel pressure.

7. The control apparatus for the diesel engine as claimed in claim 1, wherein the threshold value is a limit of the timing of the after-injection at a retardation angle side and is set on a basis of a driving condition of the diesel engine.

8. A control method for a direct injection diesel engine comprising:
setting a target fuel pressure on a basis of an engine revolution speed and a load;
variably controlling a fuel pressure supplied to a fuel injection nozzle along the target fuel pressure;
setting a base value of an injection timing of an after-injection on a basis of the engine revolution speed and the load;
correcting the base value of the injection timing of the after-injection toward an advance side in a case where an actual fuel pressure is higher than the target fuel pressure, on a basis of a difference between a detected actual fuel pressure and the target fuel pressure, during an acceleration or deceleration of the engine;
determining whether the corrected base value is equal to or lower than a threshold value;
determining whether an after-injection performed immediately after a main injection is executed or inhibited depending upon a result of the determination;
performing the after injection immediately after the main injection at a timing determined by the corrected base value when a controller determines that the corrected base value is equal to or lower than the threshold value and that the after-injection performed immediately after the main injection is executed.

* * * * *